United States Patent [19]

Singh

[11] Patent Number: 4,528,855
[45] Date of Patent: Jul. 16, 1985

[54] INTEGRAL DIFFERENTIAL AND STATIC PRESSURE TRANSDUCER

[75] Inventor: Gurnam Singh, Riverside, Calif.

[73] Assignee: ITT Corporation, New York, N.Y.

[21] Appl. No.: 626,804

[22] Filed: Jul. 2, 1984

[51] Int. Cl.³ .............................................. G01L 9/06
[52] U.S. Cl. .......................................... 73/721; 338/4
[58] Field of Search ................. 73/721, 720, 727, 726, 73/DIG. 4; 338/4, 42

[56] References Cited

U.S. PATENT DOCUMENTS

| | | | |
|---|---|---|---|
| 4,222,277 | 9/1980 | Kurtz et al. | 73/721 |
| 4,322,980 | 3/1982 | Suzuki et al. | 338/4 |
| 4,442,716 | 3/1984 | Coe et al. | 73/721 |

Primary Examiner—Donald O. Woodiel
Attorney, Agent, or Firm—T. L. Peterson; E. C. Jason

[57] ABSTRACT

Differential and static pressure transducers are provided with piezoresistive elements connected in Wheatstone bridges on the 100 surface of a silicon chip over a diaphragm etched into the chip from the back. A thin disk diaphragm is used for differential pressure (DP) and a thicker annular diaphragm around the disk diaphragm is used for static pressure (SP) measurements. Two of the elements opposite each other in each bridge are produced along one crystallographic direction (110), and the other two are produced along an orthogonal crystallographic direction (1̄10). Extra elements are produced for each pair to permit selection of a more closely matched set of four elements. A plurality of DP diaphragms with different diameters and respective bridges are provided along with a multiplexer for selecting a DP bridge in order to provide different ranges of sensitivity for the differential pressure measurements.

10 Claims, 5 Drawing Figures

4,528,855

INTEGRAL DIFFERENTIAL AND STATIC PRESSURE TRANSDUCER

BACKGROUND OF THE INVENTION

This invention relates to integrated circuit pressure transducers, and more particularly to an integral differential and static pressure transducer.

SUMMARY OF THE INVENTION

In accordance with the present invention, an integral differential and static pressure transducer is comprised of a semiconductor chip having a central disk diaphragm and a concentric annular diaphragm etched from one side, and piezoresistive elements diffused in the unetched surface, some oriented along one crystallographic direction of the chip, and others oriented along another crystallographic direction, with four elements on each diaphragm connected in a separate Wheatstone bridge, with two selected from those in one crystallographic direction, and two selected from those in the other crystallographic direction so that adjacent sides of a Wheatstone bridge will be subjected to different piezoresistive effects in response to bending forces on the diaphragms. The four elements are thus used in the Wheatstone bridge in an arrangement that places those elements parallel to each other on the diaphragm opposite to each other in the bridge circuit for increased sensitivity of the bridge circuit to pressure bending the diaphragm.

The semiconductor chip thus etched is bonded to a nonconductive plate to form a hermetically sealed annular cavity under the annular diaphragm and cylindrical cavity under the disk diaphragm. An orifice is provided in the plate to provide a fluid pressure passage into the cylindrical cavity. A tube connects the orifice to a source of fluid at one pressure while the entire unetched surface of the chip is subjected to the fluid at a second pressure. In that manner, the piezoresistive Wheatstone bridge on the annular diaphragm provides a sensitive measurement of static pressure while the piezoresistive Wheatstone bridge on the disk diaphragm provides a sensitive measurement of differential pressure.

A single semiconductor chip may be provided with a plurality of separate differential pressure transducers, each with a different radius for the disk diaphragm. Each differential pressure transducer may thus be provided for optimum operation over a separate differential pressure range. A switching means is also provided on the semiconductor chip, using standard integrated circuit technology, to enable the output of a selected bridge to be read out for a differential pressure measurement over a selected range.

The novel features of the invention are set forth with particularlity in the appended claims. The invention will best be understood from the following description when read in conjunction with the drawings.

DESCRIPTION OF PREFERRED EMBODIMENTS

Figure 1:
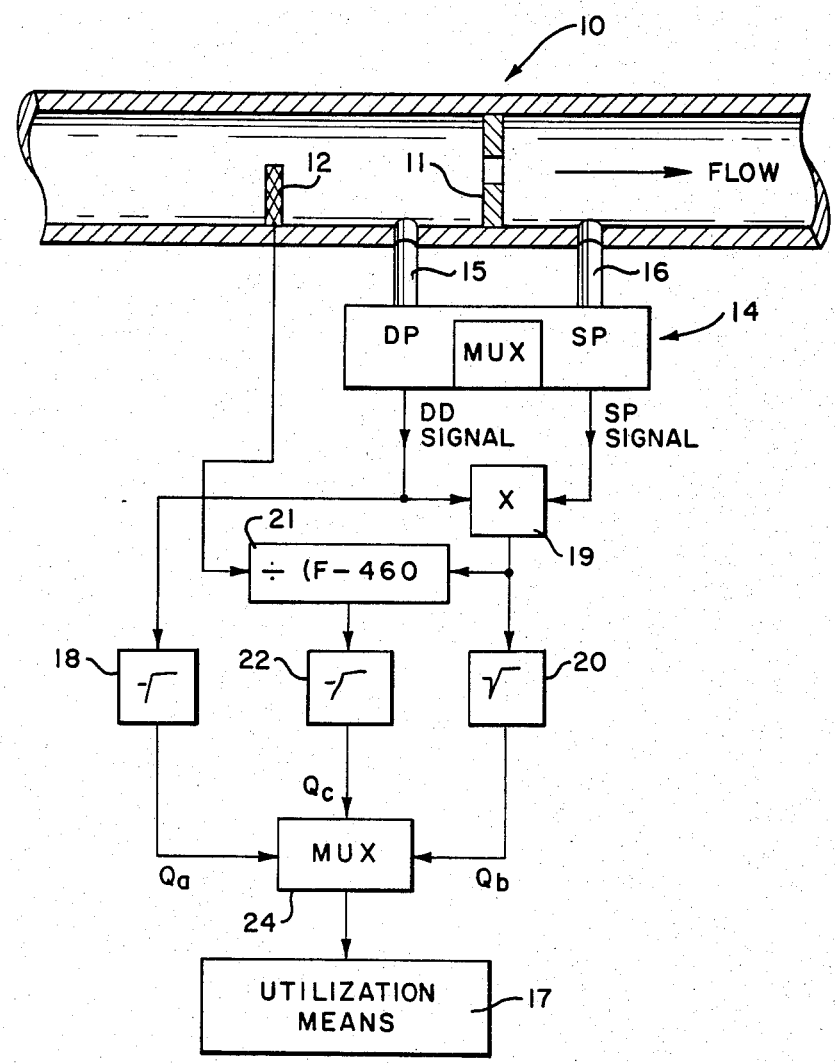
FIG. 1 is a block diagram showing an example of how the present invention is to be used.

FIG. 1 is a functional block diagram illustrating the manner in which the novel transducer to be described may be used for flow rate measurements in a pipeline 10 having an orifice plate 11, and a temperature transducer 12. An integral differential and static pressure transducer 14 is provided with passageways 15 and 16 for the fluid in the respective high and low sides of the orifice plate. As will be noted more explicitly hereinafter, the transducer 14 is in fact a single semiconductor chip with a plurality of piezoresistive Wheatstone bridge transducers, for both static and differential pressure measurements of a number of differential pressure ranges selected by a utilization means 17, such as a recording microprocessor, using a switching means or multiplexer (MUX) incorporated in the integrated circuit on the chip. Consequently, the transducer 14 includes not only a static pressure (SP) and a plurality of differential pressure (DP) bridge circuits, but also an integrated circuit for selectively reading out the DP bridge circuits for the desired differential pressure ranges. This will enable the user to select one transducer for a wide range of DP measurements.

The respective differential and static pressure output signals, DP and SP, from the transducer 14 are proportional to the differential pressure across the orifice plate 11 and the downstream static pressure, respectively. A square root extractor 18 receives the signal DP and provides a flow rate signal $Q_a$ equal to the square root of DP times a constant. A multiplier 19 and square root extractor 20 receive the signals DP and SP, and provide a flow rate signal $Q_b$ equal to the square root of the product of DP and SP times a constant $C_b$. The product of DP and SP from the multiplier 19 is also applied to a divider 21 which receives a temperature signal from the temperature transducer 12, adds to it an offset signal equal to 460 in the scale of the temperature signal, and divides the product of DP and SP by 460+F before extracting the square root of the quotient times a constant $C_c$ in an extractor 22 to provide a third flow rate measurement signal $Q_c$, which is a temperature compensated measurement of the flow rate $Q_b$. A multiplexer 24 controlled by the utilization means selects which flow rate measurement, $Q_a$, $Q_b$ or $Q_c$, is to be recorded and/or displayed.

Figure 2:
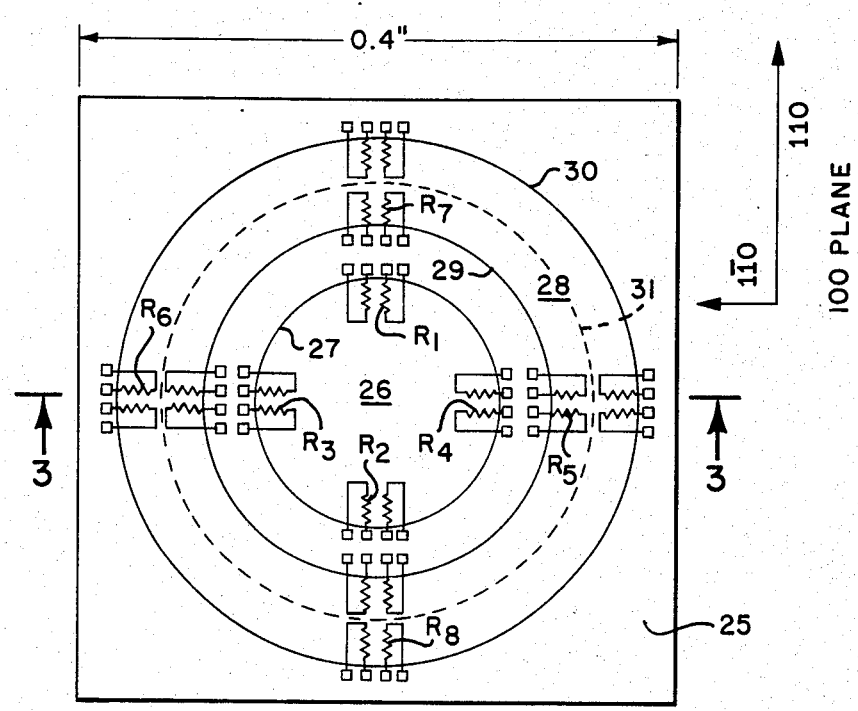
FIG. 2 is a plan view of a transducer having a single differential pressure (DP) diaphragm and a single static pressure (SP) diaphragm, each diaphragm with redundant piezoresistive (PZR) elements for Wheatstone bridge circuits.

The integral differential and static pressure transducer 14 will now be described with reference to FIG. 2. It is comprised of semiconductor chip 25, such as a silicon chip having a 100 plane surface. Etched from the back of the chip is a central disk diaphragm 26 shown by a solid line circle 27, and an annular diaphragm 28 shown by solid line circles 29 and 30. A dashed line circle 31 merely represents the center of the annular diaphragm to emphasize that piezoresistive (PZR) elements are to be produced on the surface of the annular diaphragm on both sides of that center line, eight parallel to the 1̄10 crystallogrpahic direction and eight parallel to the 110 crystallographic direction in such a way that groups of four elements appear at each optimum position which are, starting from the top, at 90° and 270° for PZR elements parallel to the 1̄10 crystallographic direction and at 180° and 360° for PZR elements parallel to the 110 crystallographic direction. The stress reverses direction, i.e., goes from compression to tension, or vice versa depending on the side to which the pressure to be measured is applied.

Although only four PZR elements are required for a bridge, it is seen that as many as sixteen can be spaced on the annular diaphragm 28, and eight on the central disk diaphragm 26. This redundancy allows selection of four elements for a bridge on each diaphragm that are most closely matched for each bridge at the time of making connection to contacts provided on the chip for each element just off the diaphragm.

These PZR elements are produced by conventional integrated circuit technology used to make resistors in an integrated circuit, such as diffusing boron into the silicon chip in the area of the element, and then providing a nitride passivation layer over the entire surface, except over terminals, before vapor depositing conductive metal connections between elements, and from the bridges to output terminals. Analysis of a diaphragm with these PZR elements shows that the stress or strain produced by pressure acting on the surface sufficient to cause bending will result in a change in resistance proportional to the pressure over a range limited by the dimension over which the diaphragm bends.

The interaction between electrical and mechanical stress-strain variables in a semiconductor, such as silicon, will be different along the 1̄10 and 110 crystallographic diections. This is used to advantage in arranging the PZR elements as described above, and then selecting four to connect in a Wheatstone bridge, two selected from those arranged in one direction opposite each other in the bridge and the remaining two selected from those arranged in the other crystallographic direction for greater sensitivity of the bridge.

Normally, only one element in a Wheatstone bridge is variable. When a voltage pulse is applied across two corners, a current is produced across the other two corners proportional to the extent to which the bridge is unbalanced by any change in the variable element. If two variable elements connected to the same corner are included in the bridge, and if they are subjected to forces that produce different piezoresistive effects because they are disposed along different crystallographic directions, the current between the two remaining corners will be increased for the same pressure. If the same arrangement is provided for the remaining two elements connected at the other corner to which the pulse is applied, the imbalance of the bridge will be even greater for the same pressure on the diaphragm. So, to make up a bridge, two PZR elements parallel to the 1̄10 direction are selected to be connected opposite each other in the bridge, and two PZR elements parallel to the 110 direction are connected to fill in the remaining sides that are opposite to each other.

Each piezoresistive element is typically about 5K ohms. Because a Wheatstone bridge is sensitive to any imbalance in the bridge, it is recognized that there may be some static imbalances. To minimize that, each element along any one crystallographic direction may be selected from the group of adjacent elements that most closely matches other elements to be used in a bridge. There is no penalty in providing extra elements for this selection, since producing as many elements as will conveniently fit parallel to the crystallographic axes is no more costly than producing one element. Each element is provided with two connector pads, one on each end, with the pads positioned over rigid portions of the chip just off the diaphragms shown in cross section in FIG. 3.

Figure 3:
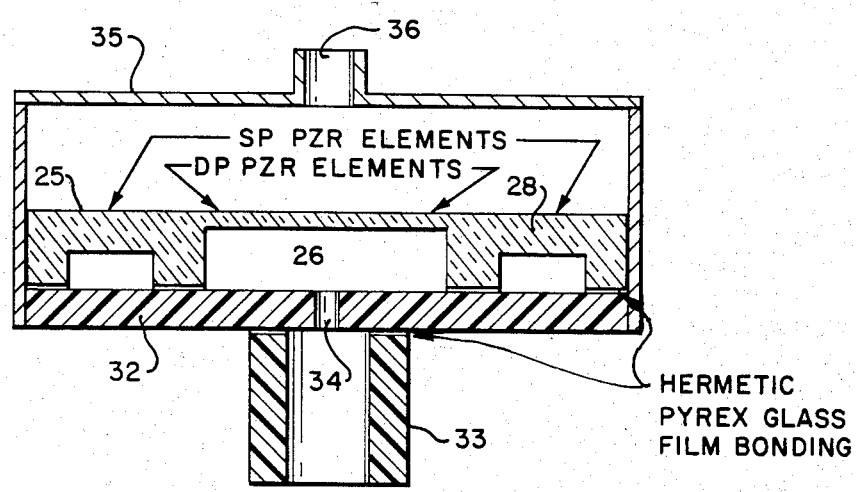
FIG. 3 is a cross section of the transducer taken on line 3—3 in FIG. 2.

Referring to FIG. 3, the semiconductor chip 25 (with the DP and SP Wheatstone bridges on the flat top) is hermetically bonded to a silicon plate 32 using a Pyrex glass film. This leaves an annular space beneath the diaphragm 28 in which a reference pressure, such as atmospheric pressure at sea level, can be sealed if bonding is done at that pressure. Note that the SP diaphragm 28 is much thicker than the DP diaphragm 26. Greater rigidity is desired for the SP piezoresistive elements for the obvious reason that it will be subjected to greater bending pressure. The DP diaphragm 26 can be, and should be, thinner because it will receive fluid pressure on both sides with only a small pressure differential available to bend it. The DP diaphragm should also have greater span across which bending may occur, thus subjecting the PZR elements to greater bending stress or strain for the same pressure differential.

A Pyrex glass tube 33 is bonded to the silicon plate 32 around an orifice 34 into the DP diaphragm cavity. The high pressure fluid upstream is coupled to this tube 33 from the pipe 10 (FIG. 1), while the low downstream pressure fluid is coupled to the space over the DP and SP diaphragms. This may be accomplished by providing a housing 35 hermetically sealed around the silicon plate, with an inlet passage 36 that may be connected to the tube 10 downstream from the orifice plate 11.

Figure 4:
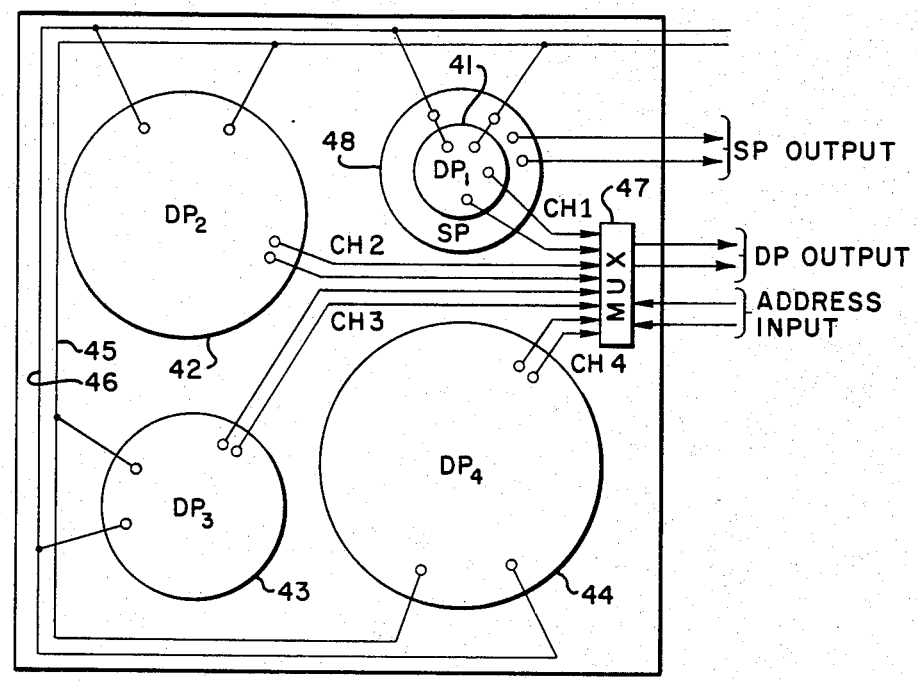
FIG. 4 is a schematic plan view of a semiconductor chip having a plurality of DP diaphragms of different dimensions selected for operation over different differential pressure ranges, and one set of DP and SP diaphragms, in a single chip with an integrated circuit means (MUX) for selecting the DP diaphragm to read out for a selected differential pressure range.

It is preferable to etch multiple sets of DP diaphragms on a single chip, each of different dimensions (thickness and/or diameter), as shown in FIG. 4, where each of the circles 41, 42, 43 and 44 represents the diameters of four DP diaphragms. Besides having a bridge for each diaphragm connected to pulsed signal buses 45 and 46, there is an integrated circuit means (MUX) 47 for selecting the DP bridge to be read out. Each DP bridge circuit thus has two output terminals connected by conductors to the MUX. These conductors, as well as those to make the bridge connections between elements, are produced on the surface of the chip using the well known photolithographic masking and metallizing techniques known in the art of manufacturing integrated circuits. The MUX also has two output connections for reading out the measurement signal from a selected DP diaphragm bridge, and two input connections for a two-bit word to select the DP diaphragm to be read out. One of the DP diaphragms is provided with an annular SP diaphragm represented by a circle 48 in FIG. 4 for reading the static pressure. One SP diaphragm is normally sufficient for all ranges of differential pressure, since static pressure is not expected to vary over a wide range while the differential pressure may, and even where the differential pressure is not expected to vary over a wide range, it may be desirable to select a more sensitive (larger diameter and/or thinner) diaphragm for greater sensitivity in differential pressure measurements. It would, of course, be possible to also provide SP diaphragms of different dimensions for different ranges, in which case a second MUX would be provided like the MUX 47 to select SP outputs, but in the usual installation, only one SP diaphragm would be provided around one DP diaphragm as illustrated in FIG. 4 for the DP diaphragm 41.

Figure 5:
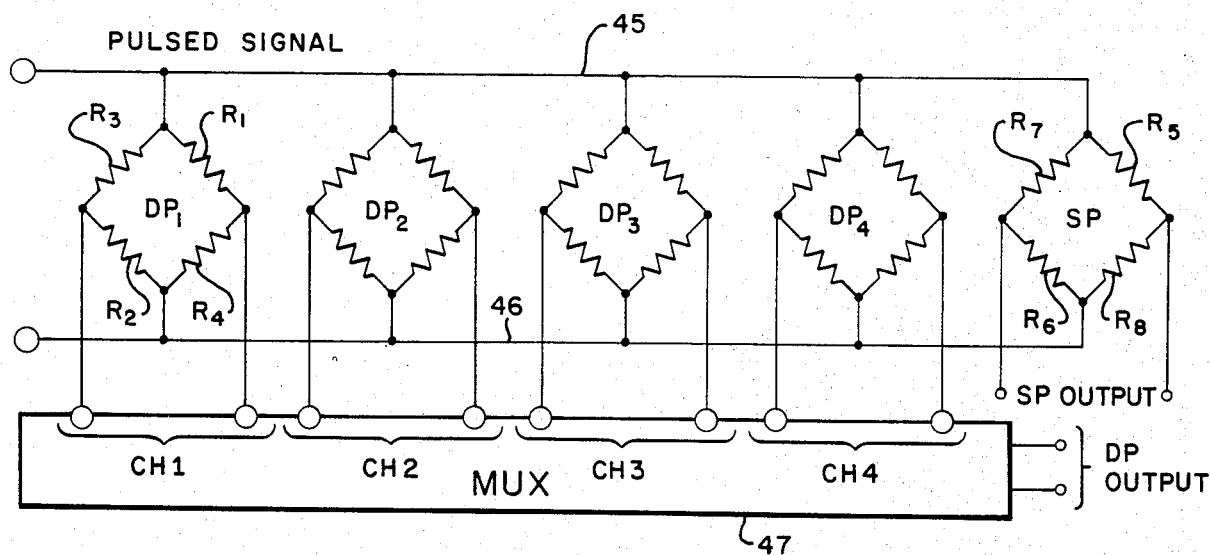
FIG. 5 illustrates schematically the Wheatstone bridge connections in the semiconductor chip of FIG. 4.

FIG. 5 illustrates four DP transducer bridges DP$_1$ through DP$_4$ on the disk diaphragms 41, 42, 43 and 44 of FIG. 4 connected to the multiplexer 47 which receives two input (address) signals, and provides a DP output signal from the selected DP bridge. A pulsed signal is applied over buses 45 and 46 to the bridges in parallel, including the SP bridge on the annular diaphragm 48, to periodically activate all of them. However, only the selected DP and the single SP bridges will produce output pulses at respective DP and SP output terminals. The amplitudes of these pulses will be proportional to the DP and SP measurements.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. An integral differential and static pressure transducer comprised of a semiconductor chip etched from one side to produce a thin differential pressure diaphragm and a thicker static pressure diaphragm surrounding the differential pressure diaphragm, and a plurality of piezoresistive elements on the surface of said diaphragms, at least four disposed over said differential pressure diaphragm with some parallel to one crystallographic direction and some parallel to another crystallographic direction, and at least four disposed over said surrounding static pressure diaphragm with some parallel to one crystallographic direction and some parallel to another crystallographic direction, and means for connecting four piezoresistive elements disposed over said differential pressure diaphragm in a Wheatstone bridge and four piezoresistive elements disposed over said surrounding static pressure diaphragm in a separate Wheatstone bridge, with piezoresistive elements for each being selected such that two are from elements disposed along one crystallographic direction and two from elements disposed along another crystallographic direction, with elements oriented along the same crystallographic direction being on opposite sides in each bridge, means for sealing a reference pressure under said surrounding static pressure diaphragm on the etched side thereof, means for coupling a fluid at one pressure to the etched side of said differential pressure diaphragm, and means for coupling a fluid at a second pressure to the unetched side of said semiconductor chip over both said differential pressure diaphragm and said surrounding static pressure diaphragm.

2. An integral differential and static pressure transducer as defined in claim 1 wherein said differential pressure is disk shaped and said static pressure diaphragm is annular and concentric with said differential pressure transducer.

3. An integral differential and static pressure transducer as defined in claim 1 wherein said semiconductor chip is comprised of single crystal silicon having a 100 plane surface, said one crystallographic direction is 110, and said other crystallographic direction is 1$\bar{1}$0.

4. An integral differential and static pressure transducer as defined in claim 2 including a plurality of additional differential pressure diaphragms of different dimensions etched in said chip from the same side, each having a plurality of piezoresistive elements oriented and connected to form Wheatstone bridges like that of the first differential pressure diaphragm, and means for selecting a Wheatstone bridge from any one of said differential pressure diaphragms to select a desired range of differential pressure measurement.

5. An integral differential and static pressure transducer as defined in claim 1 wherein said means for sealing a reference pressure under said annular diaphragm is comprised of a non-conductive plate hermetically bonded to the etched side of said chip, and said means for coupling a fluid at one pressure to the etched side of said differential pressure diaphragm is comprised of
- an orifice in said plate communicating with space between said plate and said differential pressure diaphragm,
- a tube hermetically bonded to said plate over said orifice, and
- said means for coupling a fluid at a second pressure to the unetched side of said semiconductor chip is comprised of a housing for said chip, and means for introducing said fluid at said second pressure into said housing.

6. An integral differential and static pressure transducer comprised of a semiconductor chip having a thin disk-shaped diaphragm and a concentric thicker annular diaphragm etched from one side, and piezoresistive elements diffused in the unetched surface, some oriented along one crystallographic direction of said chip, and others oriented along another crystallographic direction, with at least four elements on each diaphragm connected in a separate Wheatstone bridge with two oriented along said one crystallographic direction on opposite sides of each bridge and the other two of each bridge oriented along said other crystallographic direction.

7. A transducer as defined in claim 6 wherein the etched side of said semiconductor chip is bonded to a non-conductive plate to form a hermetically sealed annular cavity under said annular diaphragm and a cylindrical cavity under said disk-shaped diaphragm, said plate having an orifice in communication with said cylindrical cavity, and a tube connecting said orifice to a source to fluid at one pressure while the entire unetched surface of the chip is subjected to the fluid at a second pressure.

8. A transducer as defined in claim 7 wherein said semiconductor chip includes a plurality of separate etched disk-shaped diaphragms with piezoresistive elements connected for use as differential pressure transducers, each with a different dimension for the disk-shaped diaphragm for optimum operation over separate differential pressure ranges, and an integrated circuit means on the semiconductor chip for selecting a bridge from any one of said disk-shaped diaphragms to be used for differential pressure measurements over a selected range.

9. A differential pressure transducer comprised of a semiconductor chip etched from one side to produce a plurality of diaphragms, each of a different dimension and each having four piezoresistive elements for connection in a Wheatstone bridge, with two elements of the bridge opposite each other oriented along one crystallographic direction of said semiconductor chip, and the other two elements of the bridge oriented along another crystallographic direction, and integrated circuit means on the semiconductor chip for selecting a bridge from any one of said disk-shaped diaphragms to be used for differential pressure measurements over a selected range.

10. A differential pressure transducer as defined in claim 9 wherein said semiconductor chip is comprised of single crystal silicon having a 100 plane surface, and said one crystallographic direction is 110, and said other crystallographic direction is 1$\bar{1}$0.

* * * * *